(No Model.)
P. E. DROUET.
GRAIN HEADER AND HARVESTER.
No. 297,510. Patented Apr. 22, 1884.
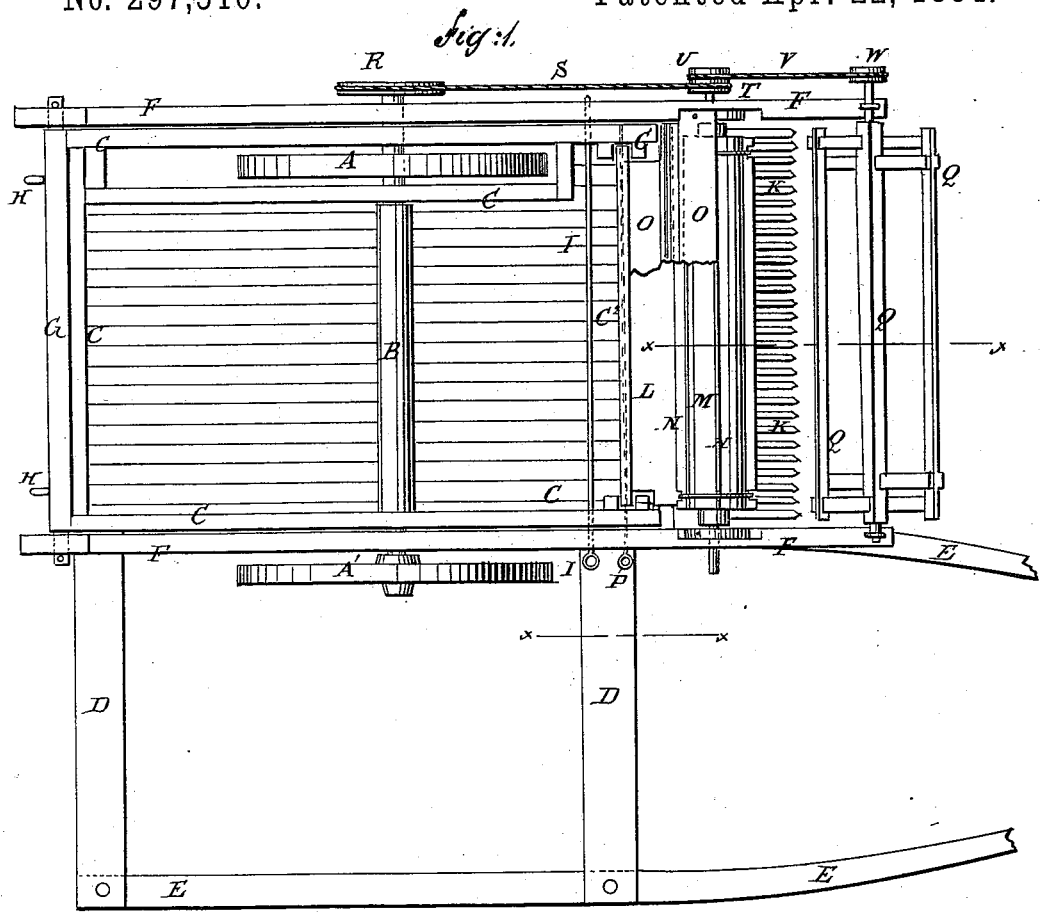
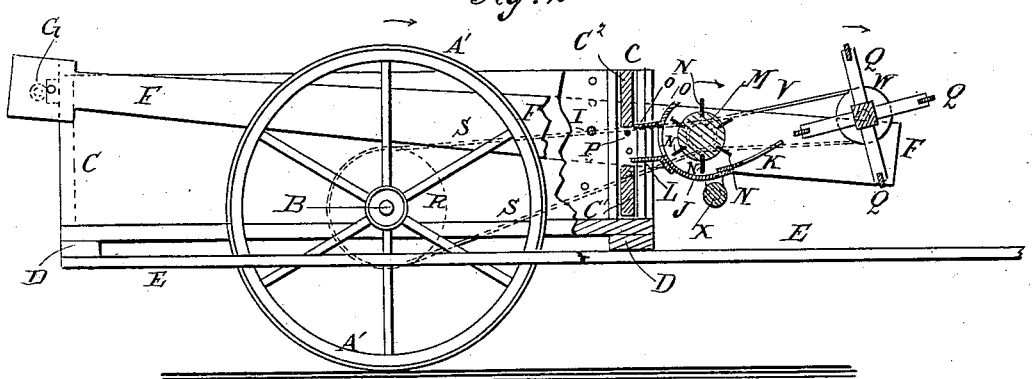
WITNESSES:
Chas. Nida
C. Sedgwick
INVENTOR:
P. E. Drouet
BY Munn & Co
ATTORNEYS.

UNITED STATES PATENT OFFICE.

PETER EDWARD DROUET, OF NEW ORLEANS, LOUISIANA.

GRAIN HEADER AND HARVESTER.

SPECIFICATION forming part of Letters Patent No. 297,510, dated April 22, 1884.

Application filed September 19, 1883. (No model.)

*To all whom it may concern:*

Be it known that I, PETER EDWARD DROUET, of New Orleans, in the parish of Orleans and State of Louisiana, have invented a new and useful Improvement in Grain Headers or Harvesters, of which the following is a full, clear, and exact description.

Reference is to be had to the accompanying drawings, forming a part of this specification, in which similar letters of reference indicate corresponding parts in all the figures.

Figure 1 is a plan view of my improvement, parts being broken away. Fig. 2 is a side elevation of the same, partly in section through the line $x\,x\,x\,x$, Fig. 1.

The object of this invention is to facilitate the harvesting of rice, wheat, and other grains.

The invention consists in the construction, arrangement, and combination of parts, as will be hereinafter set forth and claimed.

A A' represent the wheels of a cart, one, A, of which is rigidly attached to the axle B, so as to carry the said axle with it in its revolution. The other wheel, A', is loose, to facilitate turning the cart. The axle B revolves in bearings in the sides of the cart-body C, to bring the said cart-body near the ground.

To the front and rear parts of the cart-body C are attached cross-bars D, which project at one side of the cart, and to the projecting parts of which are attached the shafts E, so that the draft-animals in drawing the machine will walk upon ground from which the grain has been harvested.

At the sides of the cart-body C are placed two bars, F, the rear ends of which work upon pivots formed upon or attached to the ends of a cross-bar, G, which is secured to the rear end of the cart-body C by bolts H, so that the forward ends of the bars F can be readily raised and lowered. The forward parts of the side bars, F, are supported by a cross-rod or long bolt, I, which passes through the said side bars and the forward parts of the sides of the cart-body C. Several holes are formed in the side-boards of the cart-body, to receive the rod I, so that the forward ends of the said side bars, F, can be readily raised and lowered.

To the bars F, a little in front of the cart-body C, is attached a plate, J, having teeth K formed upon its forward edge, the spaces between the teeth being made of such a size that the stalks of grain will be slightly pinched as they are being drawn through the said spaces, so as to remove any grain left in the said heads by the scrapers hereinafter described, thereby detaching all the grain from the said heads. The plate J is concaved, and its rear part is extended as an apron to or through an opening in the forward end-board of the cart, to guide the grain into the cart-body.

To the bars F, above the concaved part of the plate J, is journaled a roller, M, to the face of which are attached a number of radial plates, N, to serve as scrapers to remove the grain from the heads of the stalks, as the said stalks are held by the toothed plate or comb J K and roots in the ground. If desired, the plates N can be replaced by steel brushes, which will do the same work in the same way.

O is a plate, the outer part of which is concaved to fit over the upper rear part of the roller M. The inner part of the plate O extends to or through the opening in the forward end of the cart-body, so as, in connection with the plate L, to form a chute or funnel to conduct the grain into the cart-body.

The forward end-board of the cart-body C is made in two or more parts, the lower one, C', of which is stationary, and the upper part or parts, $C^2$, are movable, and are supported at a proper distance above the part C' by a rod, P, passing through the forward ends of the side-boards of the said cart-body. Several holes are formed in the sides of the cart-body, to receive the rod P, so that the part $C^2$ of the end-board can be raised and lowered, as may be desired.

To the forward ends of the bars F is journaled a reel, Q, in such a position as to sweep the grain against the comb J K, so that it will be operated upon by the plates or brushes N of the roller M.

To the end of the axle B, or to the fixed wheel A, is attached a pulley, R, around which passes a belt or chain, S. The belt or chain S also passes around a pulley, T, attached to a journal of the roller M, and upon which is formed, or with it is rigidly connected, a pulley, U. Around the pulley U passes a belt or chain, V, which also passes around a pulley, W, attached to a journal of the reel Q, so that the said roller and reel will be revolved by the advance of the machine.

Beneath the forward part of the plate J is placed a small roller, X, the journals of which revolve in bearings attached to the side bars, F. The roller X is designed to lessen the friction upon the stalks, as the said stalks are being drawn under from the comb-plate J K, as the machine is drawn forward. With this construction, as the machine is drawn forward, the grain will be removed from the heads of the stalks, and will be received in the cart-body.

When a sufficient quantity of grain has been collected in the cart-body, it is dumped upon a smooth place on the ground or on a floor of canvas or other suitable material, whence it is shoveled into sacks or into wagons or carts and drawn to the barn or other place to be fanned, and then it is ready for market.

I am aware that harvester-machines have been constructed in which the reel forced the heads of the grain through an adjustable opening in the case containing the scraper or thrashing-cylinder, where the grain-heads were removed by said cylinder; also that a machine has been constructed in which no reel was used, but the grain was acted on directly by the thrashing-arms while held in place by the comb-plate, the heads being severed by a knife below the comb-plate, and I do not desire to claim, broadly, such constructions.

Having thus described my invention, I claim as new and desire to secure by Letters Patent—

1. In a grain-harvester, the combination of the cart having a front board made in two or more parts adjustable with respect to each other, the side bars, F, pivoted at their rear ends on a bar, G, secured to the upper part of the rear end of the cart, the scraper-roller, comb, reel, and driving mechanism therefor carried on the forward portions of said side bars, and a rod, I, passing through the side bars and any one of a series of holes in the forward end of each side of the cart, for the purpose of adjusting the bars at different heights, substantially as set forth.

2. In a grain-harvester, the combination of the cart having a front board made in two or more parts adjustable with respect to each other, the pivoted adjustable side bar, F, the scraper-roller and reel journaled between the forward ends of the side bars, suitable driving mechanism therefor, the comb-plate under the scraper-roller formed with or having secured thereto the rearward-extending plate L, and a cover-plate, O, also formed with a rearward-extending plate, the two said plates forming a chute adapted to project to or within the opening formed in the adjustable front board, substantially as set forth.

3. In a grain-harvester, the combination of the side bars, F, the scraper-roller and reel journaled between the forward ends of said bars, suitable driving mechanism therefor, the comb K, arranged below the scraper-roller, and a friction-roller, X, journaled in the side bars below the comb-plate, substantially as set forth.

4. In a grain-harvester, the combination, with the side-boards of the cart-body C, and the end-board made in two or more parts, of the rod P, substantially as herein shown and described, whereby the upper part or parts can be supported above the lower part to form an inlet-opening, as set forth.

PETER EDWARD DROUET.

Witnesses:
ALEX DROUET,
JAS. R. CURELL.